United States Patent
Jensen et al.

(10) Patent No.: US 10,195,576 B2
(45) Date of Patent: Feb. 5, 2019

(54) ROTOR FOR A PYROLYSIS CENTRIFUGE REACTOR

(71) Applicant: Danmarks Tekniske Universitet, Kgs. Lyngby (DK)

(72) Inventors: Peter Arendt Jensen, Koebenhavn S (DK); Trung Ngoc Trinh, Trondheim (NO); Rasmus Lundgaard Christensen, Frederiksvaerk (DK); Kim Dam-Johansen, Frederiksvaerk (DK); Niels Bech, Jyderup (DK)

(73) Assignee: Danmarks Tekniske Universitet, KGS. Lyngby (DK)

( * ) Notice: Subject to any disclaimer, the term of this patent is extended or adjusted under 35 U.S.C. 154(b) by 187 days.

(21) Appl. No.: 15/129,874

(22) PCT Filed: Mar. 27, 2015

(86) PCT No.: PCT/EP2015/056736
§ 371 (c)(1),
(2) Date: Sep. 28, 2016

(87) PCT Pub. No.: WO2015/150265
PCT Pub. Date: Oct. 8, 2015

(65) Prior Publication Data
US 2017/0136431 A1    May 18, 2017

(30) Foreign Application Priority Data
Mar. 31, 2014  (EP) .................................... 14162582

(51) Int. Cl.
*C10B 47/34*     (2006.01)
*B01J 6/00*      (2006.01)
(Continued)

(52) U.S. Cl.
CPC ................. *B01J 6/008* (2013.01); *B01J 8/10* (2013.01); *C10B 47/34* (2013.01); *C10B 53/02* (2013.01); *Y02E 50/14* (2013.01)

(58) Field of Classification Search
CPC .................................... C10B 1/06; C10B 1/10
See application file for complete search history.

(56) References Cited

U.S. PATENT DOCUMENTS 1,171,583 A * 2/1916 Benson .................. E01C 19/05
                                                        126/41 B
1,541,135 A   6/1925 Ginet
(Continued)

FOREIGN PATENT DOCUMENTS

| CN | 102220152 A | 10/2011 |
| RU | 2405622 C2 | 12/2010 |
| WO | WO-2012/125586 A2 | 9/2012 |

OTHER PUBLICATIONS

ESPACENET translation of CN 102220152 Obtained Jun. 21, 2018. (Year: 2018).*
(Continued)

*Primary Examiner* — Jonathan Miller
(74) *Attorney, Agent, or Firm* — Harness, Dickey & Pierce, P.L.C.

(57) ABSTRACT

The present invention relates to a rotor for a pyrolysis centrifuge reactor, said rotor comprising a rotor body having a longitudinal center axis, and at least one pivotally mounted blade being adapted to pivot around a pivot axis under rotation of the rotor body around the longitudinal center axis. Moreover, the present invention relates to a pyrolysis centrifuge reactor applying such a rotor.

10 Claims, 4 Drawing Sheets

(51) Int. Cl.
  *B01J 8/10*   (2006.01)
  *C10B 53/02*  (2006.01)

(56) References Cited

U.S. PATENT DOCUMENTS

| | | | | |
|---|---|---|---|---|
| 1,717,786 | A * | 6/1929 | Clayton-Kennedy | C10B 1/10 |
| | | | | 201/33 |
| 1,905,055 | A * | 4/1933 | Puening | C10B 7/00 |
| | | | | 201/10 |
| 4,038,184 | A * | 7/1977 | Svanteson | C02F 11/121 |
| | | | | 159/25.1 |
| 4,279,692 | A | 7/1981 | Chino et al. | |
| 4,341,595 | A | 7/1982 | Chino et al. | |
| 4,752,135 | A * | 6/1988 | Loomans | B29B 7/482 |
| | | | | 366/297 |
| 5,082,534 | A * | 1/1992 | Breu | C10B 1/10 |
| | | | | 201/32 |
| 5,194,069 | A * | 3/1993 | Someus | C10B 47/30 |
| | | | | 201/33 |
| 5,225,044 | A * | 7/1993 | Breu | C10B 1/10 |
| | | | | 201/26 |
| 7,625,532 | B2 * | 12/2009 | Bridgwater | B01J 8/10 |
| | | | | 202/100 |
| 8,882,966 | B2 * | 11/2014 | Bronshtein | C10B 1/10 |
| | | | | 202/117 |
| 9,494,038 | B2 | 11/2016 | Bushuev | |
| 2005/0173237 | A1 | 8/2005 | Bridgwater et al. | |
| 2015/0083366 | A1 | 3/2015 | Zakis et al. | |

OTHER PUBLICATIONS

International Search Report PCT/ISA/210 for International Application No. PCT/EP2015/056736 dated Jul. 6, 2015.
Written Opinion of the International Searching Authority PCT/ISA/237 for International Application No. PCT/EP2015/056736 dated Jul. 6, 2015.
Decision to Grant for corresponding Russian Application No. 2016142396/05(067877) dated Oct. 9, 2018 (English translation).
Search Report for corresponding Russian Application No. 2016142396(067877) dated Oct. 9, 2018 (English translation).

* cited by examiner

ROTOR FOR A PYROLYSIS CENTRIFUGE REACTOR

CROSS-REFERENCE TO RELATED APPLICATIONS

This application is the U.S. National Phase application of PCT Application No. PCT/EP2015/056736 filed on Mar. 27, 2015, which claims priority to European Patent Application No. 14162582.2 filed on Mar. 31, 2014, the entire contents of each of which are incorporated herein by reference.

FIELD OF THE INVENTION

The present invention relates to a rotor for a pyrolysis centrifuge reactor (PCR). In particular, the present invention relates to a rotor which is suitable for being operated at low rotational speeds. Moreover, the rotor of the present invention is capable of treating a solid feed, such as a biomass, having particles of different sizes.

BACKGROUND OF THE INVENTION

Various rotor designs for PCRs have been suggested over the year. One rotor design has been suggested in U.S. Pat. No. 7,625,532 where in particular FIGS. 4 and 5 show details of the suggested rotor.

Referring now to FIG. 4 of U.S. Pat. No. 7,625,532 the rotor drum 37 provides a suitable surface onto which the blades 28 are attached. The blades 28 are bolted to the rotor drum 37 at 45 degrees intervals such that there are eight equally spaced blades 28 positioned around the rotor drum 37. Each blade 28, which in FIG. 4 extends substantially the whole length of the reaction vessel 20, is mounted at a first end thereof onto the rotor drum 37 via a mechanical support 28a. In FIG. 5 the blades 28 are axially spaced along the length of the reaction vessel 20.

Each blade 28 has a free second end which is spaced from the internal wall of the reaction vessel 20 forming the ablative surface 20a by about 1 mm or less. Between its first and second ends each blade 28 has a curved front surface 28b. In the shown embodiment the blades 28 are permanently fixed at a predetermined angle to give a fixed clearance from the ablative surface 20a. In a modification of the shown embodiment, the blades may be provided with calibration screws which allow for adjustment of the blade angle and/or clearance, cf. column 3, last sentence. However, during operation of the PCR the blade angle and/or clearance is fixed.

It is a disadvantage of the arrangement shown in U.S. Pat. No. 7,625,532 that the fixation of the blade angle and/or clearance, i.e. the fixed position of the blades 28 relative to the ablative surface 20a, allows treatment of biomasses with only a certain particle size. In the arrangement shown in U.S. Pat. No. 7,625,532 small particles will not be pressed against the ablative surface 20a. Moreover, large particles may be stocked or wedged between the blades 28 and the ablative surface 20a.

It may be seen as an object of embodiments of the present invention to provide a rotor for a PCR which is capable of being operated at low rotational speeds.

It may be seen as a further object of embodiments of the present invention to provide PCR which is capable of treating a solid feed with different particle sizes into char, tar and gasses.

DESCRIPTION OF THE INVENTION

The above-mentioned objects are complied with by providing, in a first aspect, a rotor for a pyrolysis centrifuge reactor, said rotor comprising
  a rotor body having a longitudinal centre axis, and
  at least one pivotally mounted blade being adapted to pivot around a pivot axis under rotation of the rotor body around the longitudinal centre axis, wherein the at least one pivotally mounted blade is positioned in a recess formed in a peripheral surface of the rotor body.

The rotor design of the present invention offers several advantages over known systems. Firstly, the pivotally mounted rotor blade allows that solid feed particles of different sized may be treated. Secondly, the rotor design allows that the rotor may be operated at low rotational speeds while still maintaining a sufficient yield. The reason for this being that the total weight of the at least one pivotally mounted blade provide pressure to the solid feed particles while being pressed against an inner wall of a reactor housing.

Thirdly, the positioning of the pivotally mounted rotor blade in a recess ensures that the dimensions, such as the diameter, of the rotor body may be optimized with respect to a reaction vessel being formed between the peripheral surface of the rotor body and an inner surface of an associated reactor housing. The term optimized is here to be understood as a rotor body having for example a large diameter whereby the volume of the reactor vessel is reduced accordingly. The reduced volume of the reactor vessel ensures that the gas residence time within the reactor vessel is minimized whereby the gas phase polymerization and cracking is also minimized. This ensures that the yield of liquid after cooling the gas is maximized. The term relatively short is here to be understood as a time period typically being shorter than 2 seconds.

The pivot axis may be essentially parallel to the longitudinal centre axis.

The rotor may comprise a plurality of pivotally mounted blades. The number of pivotally mounted blades may be chosen in order to fulfil given demands. The number of pivotally mounted blades may thus be 2, 3, 4, 5, 6, 7, 8 or even more. Each of the plurality of pivotally mounted blades may be adapted to pivot around an associated pivot axis under rotation of the rotor body. In fact each of the plurality of pivotally mounted blades may pivot freely between an inner position and an outer position. This allows that a solid feed with different sixed particles may be treated. Particle sizes up to several millimeters, such as 2, 3, 4, 5, 6, 8, 10 or even 50 mm, may be treated. Also, elongated particles having dimensions such as 8×150 mm may be treated as well.

The rotor body may take a cylindrical shape, and the plurality of pivotally mounted blades may be positioned in respective recesses formed in a peripheral surface of the cylindrically shaped rotor body. The shape of the recesses may define the inner position of the freely pivoting blades. At this inner position a pivotally mounted blade may be completely hidden within its recess. Each of the pivotally mounted blades may be implemented as a single coherent structure. Alternatively, each of the pivotally mounted blades may be implemented as a plurality of structures being arranged next to each other in the longitudinal direction of the blade. The structures forming a single blade may pivot completely independently of each other.

The rotor may further comprise a rotor axle, said rotor axle coinciding with the longitudinal axis of the rotor body.

The rotor axle is adapted to engage with a set of bearings secured to a reactor housing within which the rotor is adapted to be mounted.

In a second aspect, the present invention relates to a pyrolysis centrifuge reactor comprising
- a reactor housing having a centre axis,
- a rotor body having a longitudinal centre axis which essentially coincide with the centre axis, said rotor comprising at least one pivotally mounted blade being adapted to pivot around a pivot axis under rotation of the rotor body around the longitudinal centre axis, said pivot axis being essentially parallel to the longitudinal centre axis, wherein the at least one pivotally mounted blade is positioned in a recess formed in a peripheral surface of the rotor body.

The advantages mentioned in relation to the rotor also apply to the reactor in that the reactor makes use of the rotor design according to the first aspect of the invention. As it will be illustrated later the rotor is arranged inside the reactor housing in a manner so that the longitudinal centre axis of the rotor coincides with the centre axis of the reactor housing.

Generally, the rotor may be implemented as disclosed in connection with the first aspect. Thus, the rotor may comprise a plurality of pivotally mounted blades. Each of the plurality of pivotally mounted blades may be adapted to pivot freely around an associated pivot axis under rotation of the rotor body. The number of pivotally mounted blades may be chosen so as to comply with certain predetermined demands.

The rotor body may take a cylindrical shape, and each of the plurality of pivotally mounted blades may be positioned in respective recesses formed in a peripheral surface of the cylindrically shaped rotor body. A reaction vessel for treating a solid feed may be formed between the peripheral surface of the rotor body and an inner surface of a cylindrically shaped reactor housing. The reactor housing and rotor body may thus be arranged in a concentric manner with coinciding centre axes.

The plurality of pivotally mounted blades is adapted to pivot between an inner position, given by the shape of the recesses in the rotor body, and an outer surface given by the inner surface of the reactor housing. Appropriate heating means for heating the inner surface of the reactor housing may be provided as well. The appropriate heating means may be arranged on the outside of the reactor housing though being thermally connected thereto in order to be able to heat the inner surface of the reactor housing in accordance with specific demands. Typically, treating temperatures, i.e. the temperature of the inner surface of the reactor housing, may range from 300° C. to 750° C.

The reactor housing may comprise an inlet and an outlet in order to lead a solid feed to and from the reactor vessel, respectively. Appropriately formed tracks may be formed in or on the inner surface of the reactor housing in order to lead a solid feed from the inlet to the outlet.

The volume of the reaction vessel may be varied by varying the distance between the inner surface of the reactor housing and the rotor body. The larger the distance the bigger solid feed particles may be treated. Hence, the reactor vessel may be tailored to the sizes of the solid feed particles to be treated.

The freely pivoting blades allow that a solid feed may be treated while rotating the rotor at relatively slow rotational speeds, i.e. rpm. Hence, the rotor of the present invention is adapted to rotate less than 6000 rpm, such as less than 5000 rpm, such as less than 4000 rpm, such as less than 3000 rpm, such as less than 2000 rpm, such as less than 1000 rpm.

BRIEF DESCRIPTION OF THE DRAWINGS

The present invention will now be described in details with reference to the accompanying figures where.

Figure 1:
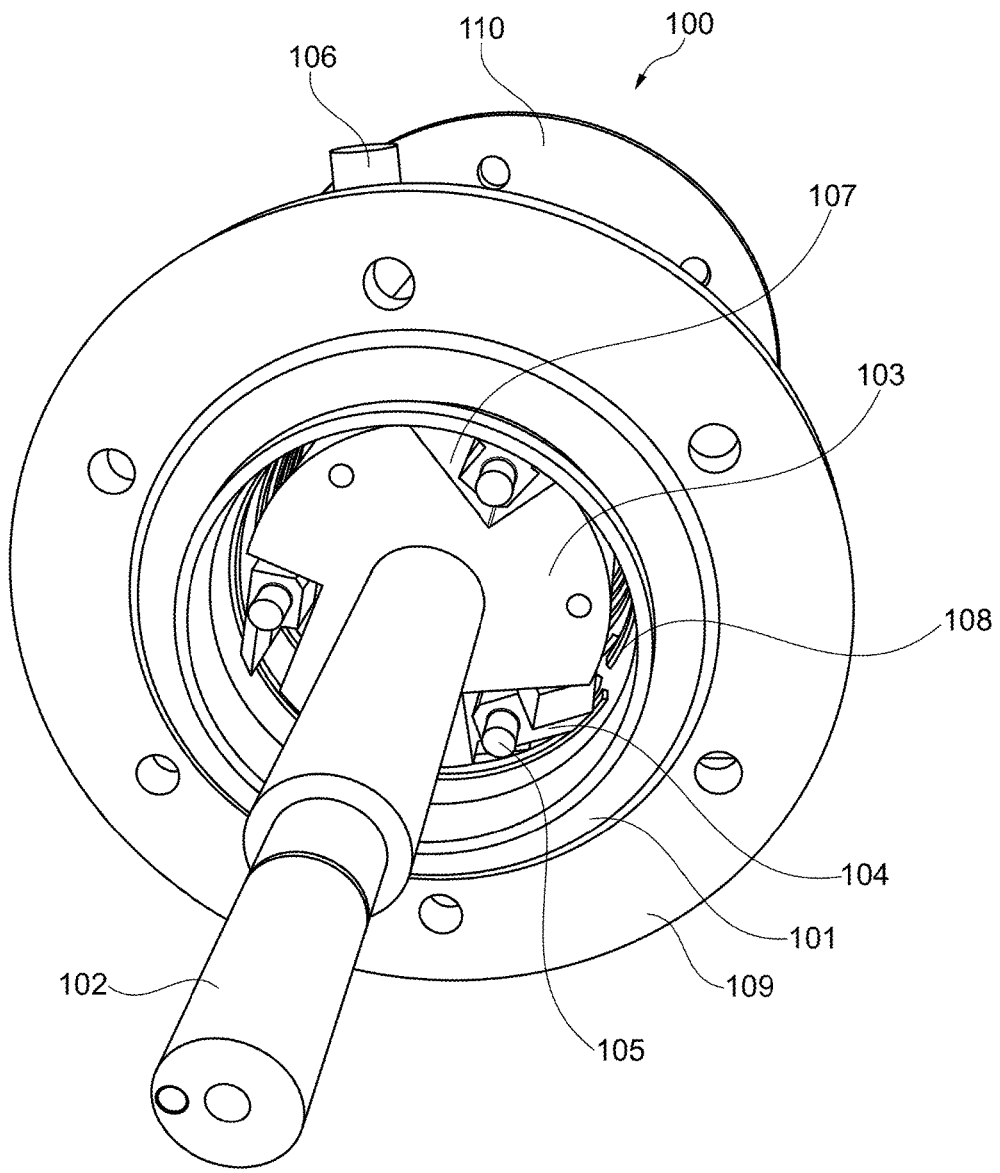
FIG. 1 shows a three-dimension view of a PCR with a rotor according to the present invention.

While the invention is susceptible to various modifications and alternative forms, specific embodiments have been shown by way of examples in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its most general aspect the present invention relates to a PCR including a rotor which may be operated at relatively low rotational speeds while still maintaining a sufficient yield. By relatively low rotational speeds are meant rotational speeds typically being below 5000 rpm. Moreover, the design of the PCR rotor of the present invention allows that a solid feed with different particle sizes may be treated.

Thus, the rotor of the present invention is used to press a solid feed, such as biomass, waste or fossil solid fuels, onto a hot tube surface having a temperature between 300° C. and 750° C. and as well transport the solid feed and solid product through a tube shaped reactor whereby it is possible to convert the solid feed into char, tar and gasses.

Referring now to FIG. 1 a PCR 100 having a reactor part 101 encapsulating a rotor having a rotor body 103 arranged on a rotor axle 102 is depicted. Solid feed to be treated is let into the reactor part via inlet 106 and leaves the reactor part via an outlet (not shown). Means for heating the PCR (not shown) is arranged in connection with the outside of the reactor part.

In the shown embodiment the clearance between the rotor body 103 and the inside reactor wall 108 is around 5 mm. This clearance allows that a solid feed with particles as big as 5 mm may be treated in the PCR.

A number of pivotally mounted blades 104 (here a total of three) are mounted within associated recesses 107 formed in the surface of the rotor body 103. Each of the blades 104 are allowed to rotate freely around an axis defined by pivot axle 105. Upon rotation of the rotor body 103 the blades 104 rotate not only under the influence of centrifugal force but also under mechanical force. Solid feed particles present between the rotor body 103 and the reactor wall 108 are consequently pressed against the latter while being moved from the solid feed inlet 106 to the outlet (not shown).

As previously mentioned, the positioning of the pivotally mounted rotor blades in their respective recesses facilitate that the diameter of the rotor body 103 can be optimized with respect to the reaction vessel being formed between the rotor body 103 and the reactor wall 108. The term optimized is here to be understood as a rotor body 103 having large diameter so that the volume of the reactor vessel can be reduced accordingly whereby the gas stays within the reactor vessel only a relatively short period of time (typically less than 2 seconds).

In FIG. 1 a rotor bearing for keeping the pivotally mounted blades 104 in position is not shown. Moreover, two reactor bearings for aligning the rotor drum 103 relative to the reactor part 101 are not shown. These reactor bearings are to be secured, such as bolted, to the reactor flanges 109, 110.

Figure 2:
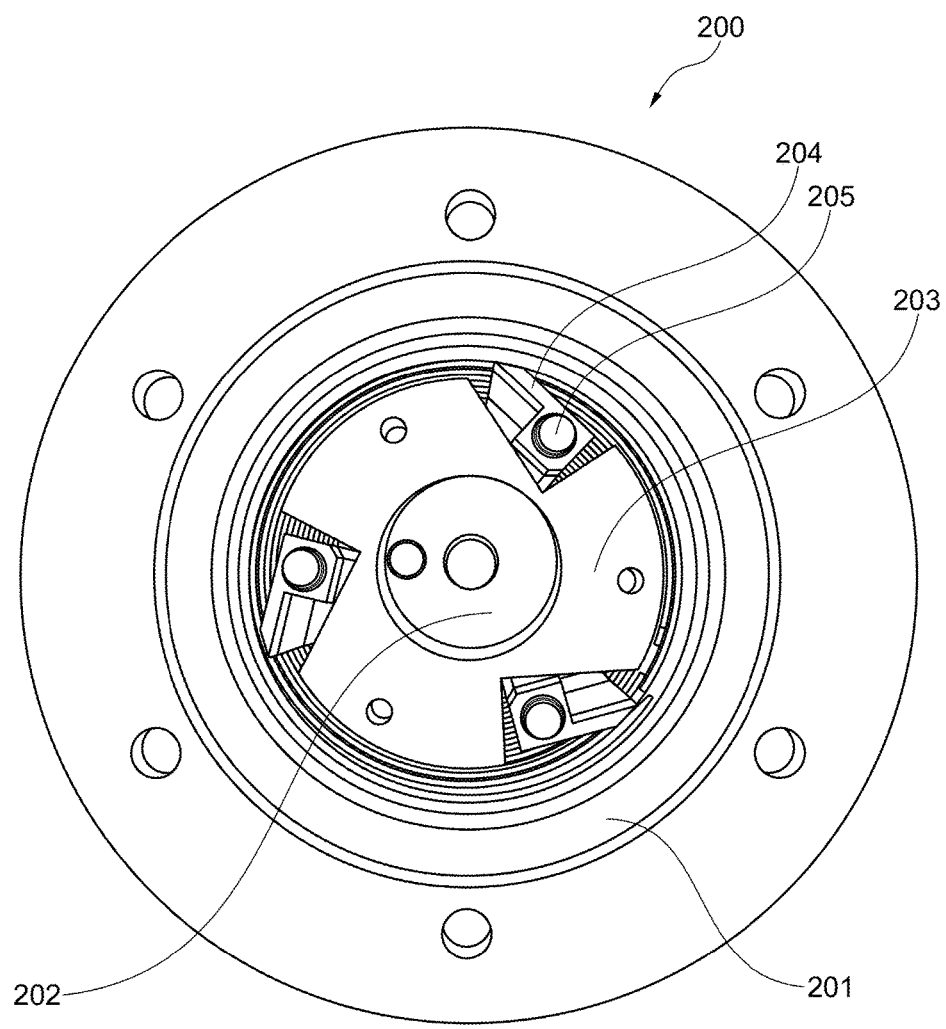
FIG. 2 shows a front view of a PCR with a rotor according to the present invention.

FIG. 2 shows a front view of the PCR 200 including the reactor part 201 and the rotor having the rotor body 203 arranged on the rotor axle 202. Again a rotor bearing for keeping the pivotally mounted blades 204 in position and a reactor bearing for aligning the rotor drum 203 relative to the reactor part 201 are not shown. The three pivotally mounted blades 204 are depicted in a position where they all abut the reaction wall of the reactor part 201. The pivot axle 205 defining the pivot axis is depicted as well.

Figure 3:
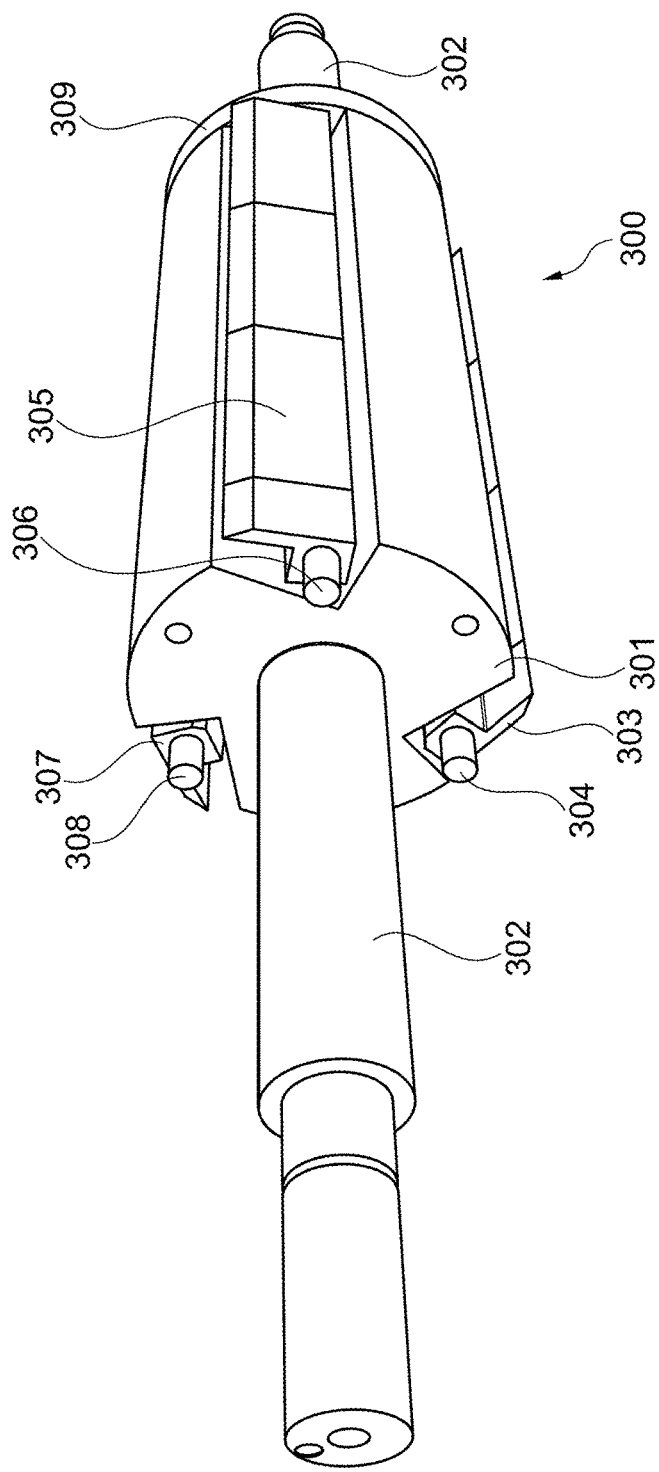
FIG. 3 shows a rotor according to the present invention without an end bearing.

FIG. 3 shows a PCR rotor 300 according to the present invention. As shown in FIG. 3 the rotor comprises a rotor body 301 secured to a centrally positioned rotor axle 302. The rotor body 301 and the rotor axle 302 may form an integral component or they may be fabricated separately and subsequently assembled. The cross-sectional shape of the rotor axle 302 may vary along its longitudinal direction in order to match the dimensions of associated bearings for aligning the PCR rotor relative to a PCR housing.

A total of three rotatable blades 303, 305, 307 are arranged within respective recesses formed in the rotor body 301. Under rotation of the PCR rotor the blades 303, 305, 307 are allowed to rotate freely about respective pivot axles 304, 306, 308. Thus, under rotation of the rotor body 301 the blades 303, 305, 307 are allowed to freely rotate between an inner position and an outer position. The inner position is given by the rotor body/recess itself whereas the outer position is the situation where the blades abut the inside of the reactor wall. Obviously the number of pivotally mounted blades may differ from three. Thus, the number of rotor blades may be 1, 2, 4, 5, 6, 7, 8 or even higher.

As depicted in FIG. 3 the overall length of the rotor blades essentially equals the length of the rotor body 301. In principle the overall length of the rotor blades may differ from the length of the rotor body. The pivotally mounted blades 303, 305, 307 are kept in position by two bearing plates 309 (only one plate is shown in FIG. 3) which as bolted to the rotor body 301 at its respective ends.

Figure 4:
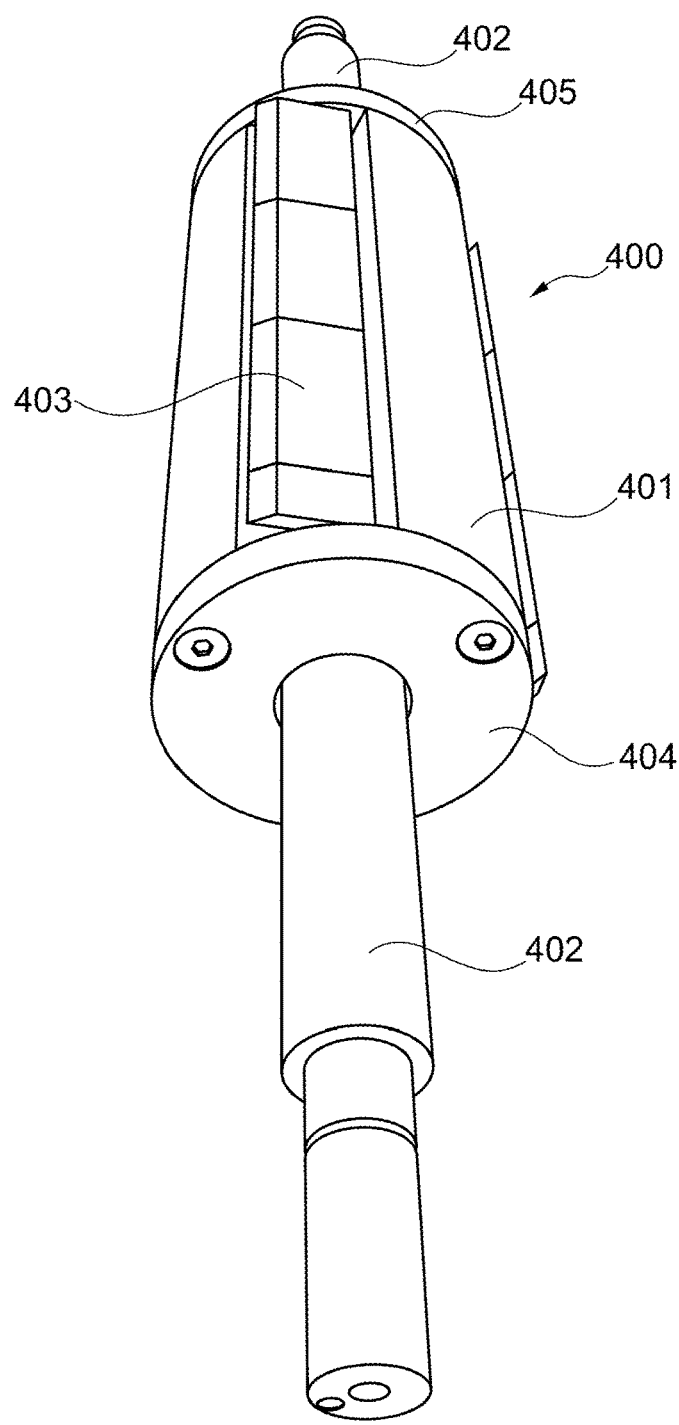
FIG. 4 shows a rotor according to the present invention with an end bearing.

A fully assembled PCR rotor 400 is depicted in FIG. 4. As shown, the PCR rotor comprises a rotor body 401 secured to or integrated with a rotor axle 402. The rotor body 401 holds a number of pivotally mounted blades 403 which are kept in position by bearing plates 404 and 405.

The invention claimed is:

1. A pyrolysis centrifuge reactor comprising:
   a reactor housing having a centre axis, the reactor housing comprising tracks formed in or on an inner surface of the reactor housing in order to lead a solid feed from an inlet to an outlet, and
   a pyrolysis rotor comprising a cylindrically shaped rotor body having a longitudinal centre axis that essentially coincides with the centre axis, and at least one pivotally mounted blade being adapted to pivot around a pivot axis under rotation of the rotor body around the longitudinal centre axis, wherein the at least one pivotally mounted blade is positioned in a recess formed in a peripheral surface of the cylindrically shaped rotor body.

2. A pyrolysis centrifuge reactor according to claim 1, further comprising a reaction vessel formed between the peripheral surface of the rotor body and the inner surface of the reactor housing.

3. A pyrolysis centrifuge reactor according to claim 2, wherein the at least one pivotally mounted blade is adapted to pivot between an inner position given by a shape of the recesses in the rotor body and an outer surface given by the inner surface of the reactor housing.

4. A pyrolysis centrifuge reactor according to claim 1, wherein the pivot axis is essentially parallel to the longitudinal centre axis.

5. A pyrolysis centrifuge reactor according to claim 1, wherein the pyrolysis rotor comprises a plurality of pivotally mounted blades.

6. A pyrolysis centrifuge reactor according to claim 5, wherein each of the plurality of pivotally mounted blades is adapted to pivot around an associated pivot axis under rotation of the rotor body.

7. A pyrolysis centrifuge reactor according to claim 5, wherein the plurality of pivotally mounted blades are positioned in respective recesses formed in the peripheral surface of the cylindrically shaped rotor body.

8. A pyrolysis centrifuge reactor according to claim 5, wherein an overall length of the plurality of pivotally mounted blades essentially equals a length of the rotor body.

9. A pyrolysis centrifuge reactor according to claim 1, further comprising a rotor axle, said rotor axle coinciding with the longitudinal centre axis of the rotor body.

10. A method of using a pyrolysis centrifuge reactor according to claim 1, wherein the rotor rotates with a speed of rotation being less than 6000 rpm.

* * * * *